US012566943B2

(12) United States Patent
Kim

(10) Patent No.: US 12,566,943 B2
(45) Date of Patent: Mar. 3, 2026

(54) METHOD AND APPARATUS WITH NEURAL NETWORK QUANTIZATION

(71) Applicant: Samsung Electronics Co., Ltd., Suwon-si (KR)

(72) Inventor: Hyunsoo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1173 days.

(21) Appl. No.: 17/483,110

(22) Filed: Sep. 23, 2021

(65) Prior Publication Data

US 2022/0391664 A1 Dec. 8, 2022

(30) Foreign Application Priority Data

Jun. 3, 2021 (KR) ........................ 10-2021-0072029

(51) Int. Cl.
G06N 3/084 (2023.01)
G06F 17/16 (2006.01)
G06N 3/04 (2023.01)

(52) U.S. Cl.
CPC .............. G06N 3/04 (2013.01); G06F 17/16 (2013.01)

(58) Field of Classification Search
CPC ...... G06N 3/04; G06N 3/0464; G06N 3/0495; G06N 3/0499; G06F 17/16
See application file for complete search history.

(56) References Cited

U.S. PATENT DOCUMENTS

| | | | | |
|---|---|---|---|---|
| 7,283,645 B2 * | 10/2007 | Krumm | ................ | G06V 10/757 |
| | | | | 382/103 |
| 10,692,244 B2 | 6/2020 | Gu et al. | | |
| 2006/0041361 A1 * | 2/2006 | Matrosov | .............. | E02F 9/2045 |
| | | | | 701/50 |
| 2017/0168586 A1 * | 6/2017 | Sinha | ...................... | G06N 20/00 |
| 2018/0089587 A1 * | 3/2018 | Suresh | ..................... | G06N 7/01 |
| 2022/0164986 A1 * | 5/2022 | Zhang | ....................... | G06T 7/73 |

FOREIGN PATENT DOCUMENTS

| | | | | |
|---|---|---|---|---|
| CN | 110443227 A | 11/2019 | | |
| CN | 110874563 A | * 3/2020 | ........ | G06K 9/00624 |
| JP | 2005-078175 A | 3/2005 | | |
| JP | 2006-140952 A | 6/2006 | | |
| KR | 10-2018-0073327 A | 7/2018 | | |
| KR | 10-2019-0029406 A | 3/2019 | | |

(Continued)

OTHER PUBLICATIONS

Shang, Fang et al. "Quaternion Neural-Network-Based PolSAR Land Classification in Poincare-Sphere-Parameter Space." *IEEE Transactions on Geoscience and Remote Sensing* vol. 52, No. 9 Sep. 2014 pp. 5693-5703.

(Continued)

*Primary Examiner* — Mariela Reyes
*Assistant Examiner* — Alexandria Josephine Miller
(74) *Attorney, Agent, or Firm* — NSIP Law

(57) ABSTRACT

A processor-implemented method with neural network quantization includes: converting each of parameter elements comprised in a multidimensional parameter vector of a multidimensional vector neural network into a Euler angle; performing quantization on the Euler angles; and determining each of quantized parameter elements based on the quantized Euler angles.

18 Claims, 9 Drawing Sheets

(56) References Cited

FOREIGN PATENT DOCUMENTS

| | | | | |
|---|---|---|---|---|
| KR | 10-2022-0152777 A | | 11/2022 | |
| WO | WO-2015027382 A1 | * | 3/2015 | ............. G06T 9/001 |
| WO | WO-2015188517 A1 | * | 12/2015 | ......... H04B 10/6165 |
| WO | WO-2018222904 A1 | * | 12/2018 | ............. G06F 17/16 |

OTHER PUBLICATIONS

Han, Song et al. "Deep Compression: Compressing Deep Neural Networks with Pruning, Trained Quantization and Huffman Coding." *Published as a conference paper at ICLR arXiv preprint arXiv:1510.00149v5* Feb. 15, 2015 pp. 1-14.

Yang, Tien-Ju et al. "Designing Energy-Efficient Convolutional Neural Networks Using Energy-Aware Pruning." *Proceedings of the IEEE Conference on Computer Vision and Pattern Recognition* 2017 pp. 5687-5695.

Kim, Hyunsoo et al. "Unsupervised Fine Land Classification Using Quaternion Autoencoder-Based Polarization Feature Extraction and Self-Organizing Mapping." *IEEE Transactions on Geoscience and Remote Sensing* vol. 56 No. 3 Mar. 2018 pp. 1839-1851.

Zhang, Shifeng et al. "Faceboxes: A CPU Real-Time Face Detector with High Accuracy." *IEEE international Joint Conference on Biometrics (IJCB)* arXiv:1708.05234v4 Dec. 25, 2017 (9 pages in English).

Zhu, Xuanyu et al. "Quaternion Convolutional Neural Networks." *Proceedings of the European Conference on Computer Vision (ECCV)* 2018 pp. 1-17.

Gaudet, Chase J. et al. "Deep Quaternion Networks." *International Joint Conference on Neural Networks (IJCNN)* arXiv:1712.04604v3 IEEE Jul. 29, 2018 (8 pages in English).

Comminiello, Danilo, et al. "Quaternion Convolutional Neural Networks for Detection and Localization of 3D Sound Events." *International Conference on Acoustics, Speech and Signal Processing (ICASSP)* IEEE, 2019 pp. 8533-8537.

Parcollet, Titouan et al. "A survey of quaternion neural networks." *Artificial Intelligence Review* vol. 53 No. 4 2020 pp. 2957-2982.

Papaioannidis, Christos et al. "3D Object Pose Estimation Using Multi-Objective Quaternion Learning." *IEEE Transactions on Circuits and Systems for Video Technology* vol. 30 No. 8 Aug. 2020 pp. 2683-2693.

* cited by examiner

810

Converting R/G/B values
from cube space to spherical surface

820

More suitable for rotation
of quaternion neural computation

METHOD AND APPARATUS WITH NEURAL NETWORK QUANTIZATION

CROSS-REFERENCE TO RELATED APPLICATIONS

This application claims the benefit under 35 USC § 119(a) of Korean Patent Application No. 10-2021-0072029 filed on Jun. 3, 2021, in the Korean Intellectual Property Office, the entire disclosure of which is incorporated herein by reference for all purposes.

BACKGROUND

1. Field

The following description relates to a method and apparatus with neural network quantization.

2. Description of Related Art

In number precision in a neural network, a floating-point representation may be gradually lowered from a 32-bit floating point (FP32) to an allowable range (e.g., within a range) of the accuracy of the neural network in order to increase an operation speed of an operator and reduce power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with neural network quantization includes: converting each of parameter elements comprised in a multidimensional parameter vector of a multidimensional vector neural network into a Euler angle; performing quantization on the Euler angles; and determining each of quantized parameter elements based on the quantized Euler angles.

The performing of the quantization may include, for each of the Euler angles, performing quantization on the Euler angle by dividing a Euler angle range at equal intervals.

The converting may include converting each of the parameter elements into the Euler angle based on a conversion characteristic between a multidimensional vector and the Euler angle.

The determining of each of the quantized parameter elements may include determining each of the quantized parameter elements from the quantized Euler angles, based on a conversion characteristic between a multidimensional vector and the Euler angles.

The multidimensional parameter vector may be a quaternion vector comprising a plurality of imaginary number elements.

The multidimensional parameter vector may include a weight vector applied to the multidimensional vector neural network.

The method may include: converting values of each pixel comprised in an image to be input to the multidimensional vector neural network into coordinates on a spherical surface; and determining a multidimensional input vector comprising the converted values of each pixel as elements.

The values of each pixel comprised in the image may be converted into the coordinates on the spherical surface by dividing the values of each pixel by a square root of the values of each pixel.

The method may include: converting each of input elements comprised in the multidimensional input vector into a second Euler angle; performing second quantization on the second Euler angle; and determining each of quantized input elements based on a second quantized Euler angle obtained through the second quantization.

The method may include performing quantization on each of input elements comprised in a multidimensional input vector that is input to a layer of the neural network corresponding to the quantized parameter elements based on the Euler angle.

In another general aspect, one or more embodiments include a non-transitory computer-readable storage medium storing instructions that, when executed by a processor, configure the processor to perform any one, any combination, or all operations and methods described herein.

In another general aspect, an apparatus with neural network quantization includes: one or more processors configured to: convert each of parameter elements comprised in a multidimensional parameter vector of a multidimensional vector neural network into a Euler angle;

perform quantization on the Euler angles; and determine each of quantized parameter elements based on the quantized Euler angles.

For the performing of the quantization, the one or more processors may be configured to, for each of the Euler angles, perform quantization on the Euler angle by dividing a Euler angle range at equal intervals.

For the converting, the one or more processors may be configured to convert each of the parameter elements into the Euler angle based on a conversion characteristic between a multidimensional vector and the Euler angle.

For the determining of each of the quantized parameter elements, the one or more processors may be configured to determine each of the quantized parameter elements from the quantized Euler angle, based on a conversion characteristic between a multidimensional vector and the Euler angle.

The multidimensional parameter vector may be a quaternion vector comprising a plurality of imaginary number elements.

The multidimensional parameter vector may include a weight vector applied to the multidimensional vector neural network.

The one or more processors may be configured to: convert values of each pixel comprised in an image to be input to the multidimensional vector neural network into coordinates on a spherical surface; and determine a multidimensional input vector comprising the converted values of each pixel as elements.

The values of each pixel comprised in the image may be converted into the coordinates on the spherical surface by dividing the values of each pixel by a square root of the values of each pixel.

In another general aspect, a processor-implemented method with neural network quantization includes: converting multidimensional parameters of a high-precision neural network by applying an angle function to the parameters; performing quantization on the converted parameters; and generating a low-precision neural network by applying another angle function to the quantized parameters.

The angle function may be an inverse of the other angle function.

The method may include performing a multidimensional vector neural operation on an input vector using the generated low-precision neural network.

The operation may include any one of a multiplication and accumulation (MAC), batch normalization, pooling, and activation operation.

The method may include performing an inference operation based on a result of the operation.

Other features and aspects will be apparent from the following detailed description, the drawings, and the claims.

Figure 1:
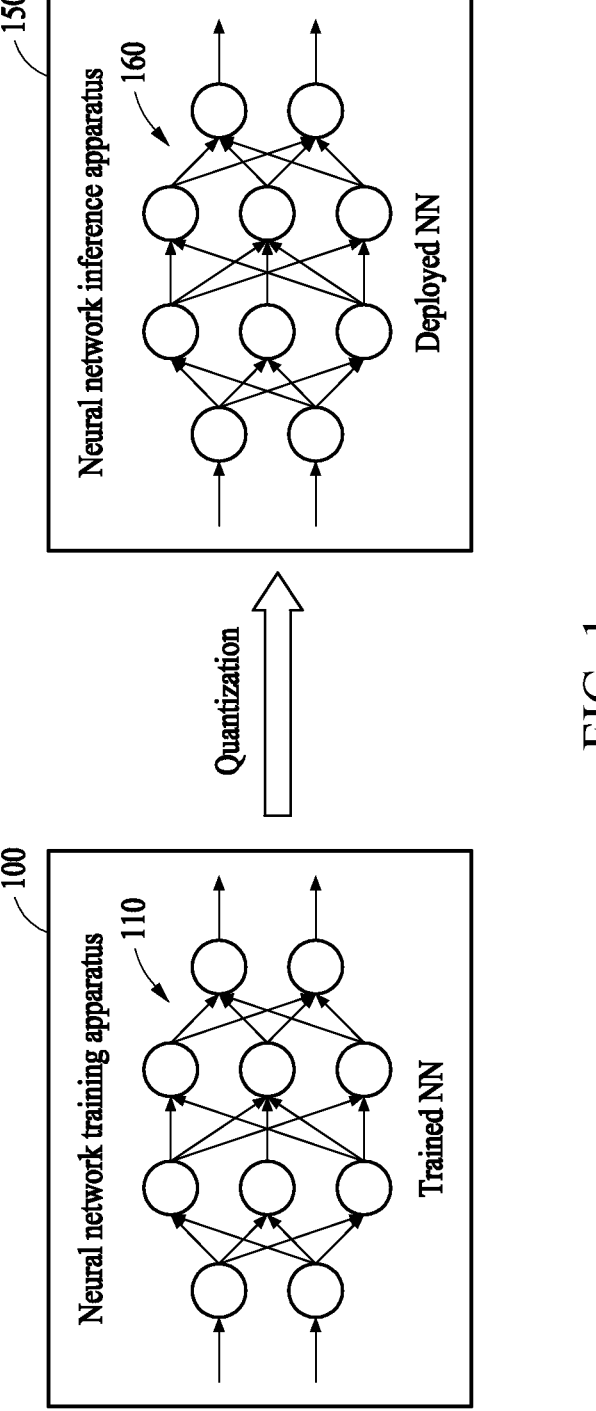
FIG. 1 illustrates an example of performing quantization on a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of performing quantization on a neural network.

Referring to FIG. 1, a neural network training apparatus 100 may correspond to a computing device having various processing functions including, for example, generating, training, or retraining a neural network. For example, the neural network training apparatus 100 may be, or may be implemented in, various types of devices such as a personal computer (PC), a server device, a mobile device, and the like.

The neural network training apparatus 100 may generate a trained neural network 110 by repeatedly training a given initial neural network. The initial neural network may have parameters in a high-precision format (e.g., 32-bit floating-point (FP32) format, though examples are not limited thereto) to achieve accuracy in processing a neural network. These parameters may include various types of data, for example, input/output activations, weights, and biases that are input to and output from the neural network. As the neural network is repeatedly trained, the parameters in the high-precision format may be adjusted or tuned to calculate a more accurate output for a given input.

The neural network training apparatus 100 may transfer the trained neural network 110 to a neural network inference apparatus 150. The neural network inference apparatus 150 may be, or may be included in, for example, a mobile device and/or an embedded device. The neural network inference apparatus 150 may be dedicated hardware for driving a neural network and be implemented with relatively lower power or low performance, and may thus be implemented to be more suitable for an operation in a low-precision format (e.g., 8-bit format, 4-bit format, etc.) than a high-precision format. While non-limiting examples have been given of an FP32 high-precision format and an 8 or 4-bit low-precision format, examples are not limited thereto, and the high-precision and low-precision formats may be of various formats where a number of bits of the high-precision format is greater than a number of bits of the low-precision format, according to other non-limiting examples.

The neural network inference apparatus 150 driving a quantized neural network 160 may be implemented in an independent device separate from the neural network training apparatus 100. However, examples may not be limited thereto, and the neural network inference apparatus 150 may also be implemented in the same device as the neural network training apparatus 100 (as non-limiting examples, the neural network training apparatus 100 may include the neural network inference apparatus 150, the neural network inference apparatus 150 may include the neural network training apparatus 100, or another device may include the neural network training apparatus 100 and the neural network inference apparatus 150).

Compared to the low-precision format, the high-precision format may need a relatively greater computation amount and a greater frequency of memory access. A multiplication and accumulation (MAC) operation using various parameters may occupy a great portion of the computation amount needed to process a neural network. Thus, the neural network inference apparatus 150, e.g., when included in a mobile device and an embedded device, such as, for example, a smartphone, a tablet, and a wearable device, which have relatively low processing performance, may not readily process a neural network having parameters of the high-precision format. Thus, to implement a neural network with only an allowable loss of accuracy while sufficiently reducing a computation amount in such devices, an apparatus of one or more embodiments may quantize the parameters of the high-precision format to be processed in the neural network. The quantizing of parameters, or parameter quantization, used herein may be construed as converting a parameter from a high-precision format into a low-precision format (e.g., from a precision to a lower precision).

An apparatus for performing quantization on a neural network, hereinafter a neural network quantization apparatus (e.g., an apparatus with neural network quantization), may perform quantization to convert parameters of the trained neural network 110 into a preset bit low-precision format. The neural network quantization apparatus may be included in the neural network training apparatus 100 and/or the neural network inference apparatus 150, may be an independent hardware accelerator, or may include the neural network training apparatus 100 and/or the neural network inference apparatus 150. The neural network quantization apparatus may perform quantization to convert the parameters of the trained neural network 110 into the preset bit low-precision format and transfer a result of the quantization to the neural network inference apparatus 150 in which the quantized neural network 160 is to be deployed, based on a processing performance of a device of the neural network inference apparatus 150 in which the neural network is to be deployed.

The neural network inference apparatus 150 in which the quantized neural network 160 is to be deployed may be included in, for example, an autonomous vehicle, a robot, a smartphone, a table device, an augmented reality (AR) device, and/or an Internet of Things (IoT) device, which perform voice and image recognition based on a neural network, but examples may not be limited thereto.

Figure 2:
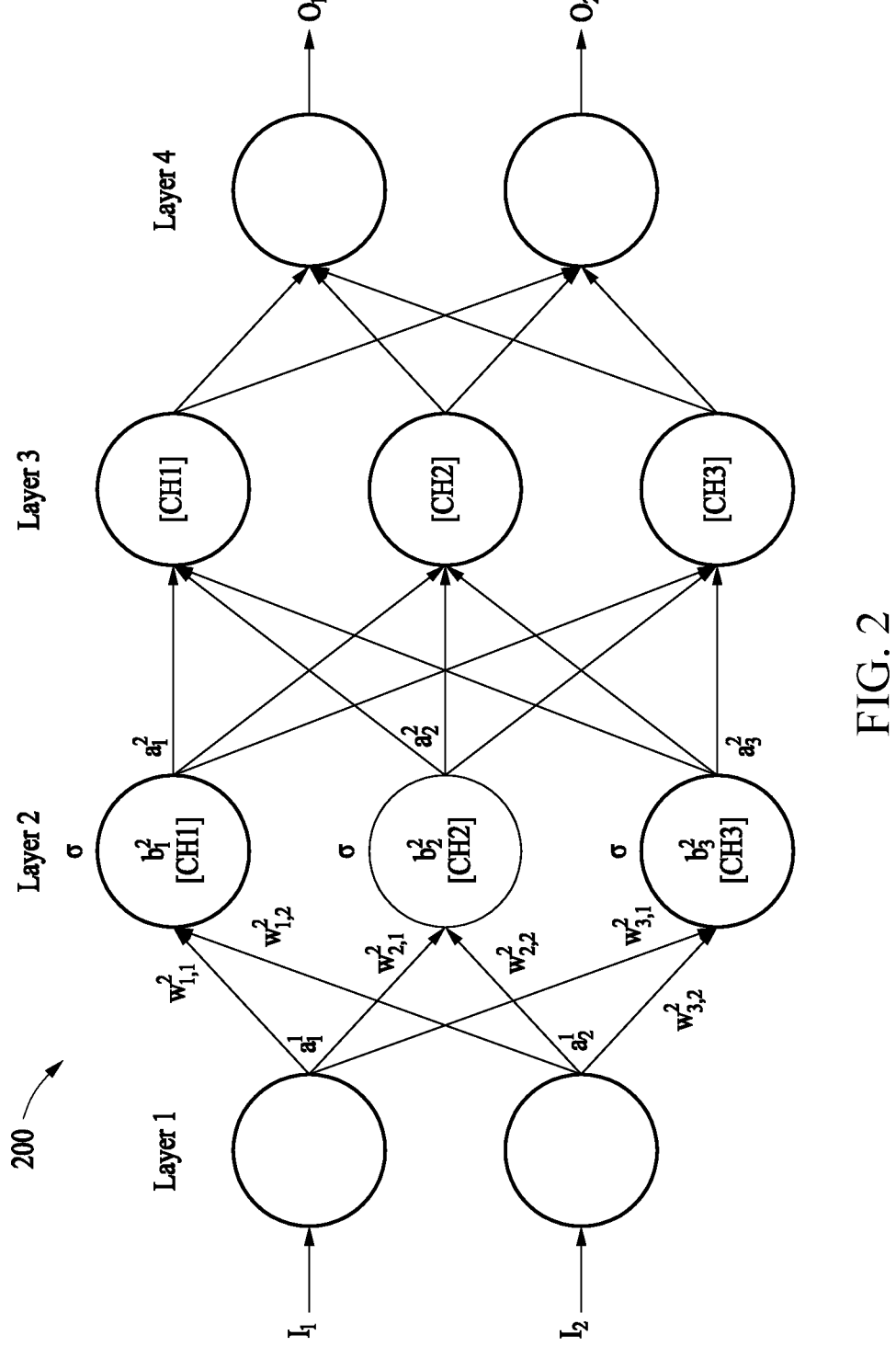
FIG. 2 illustrates an example of an operation performed in a neural network.

FIG. 2 illustrates an example of an operation performed in a neural network. Referring to FIG. 2, a neural network 200 may include an input layer, hidden layers, and an output layer, and perform an operation based on received input data (e.g., $I_1$ and $I_2$) and generate output data (e.g., $O_1$ and $O_2$) based on a result of the operation.

The neural network 200 may be a deep neural network (DNN) or an n-layer neural network including two or more hidden layers. For example, as illustrated in FIG. 2, the neural network 200 may be a DNN including an input layer (Layer 1), two hidden layers (Layer 2 and Layer 3), and an output layer (Layer 4). The DNN may include, for example, a convolutional neural network (CNN), a recurrent neural network (RNN), a deep belief network (DBN), a restricted Boltzmann machine (RBM), and the like, but examples may not be limited thereto.

For example, when the neural network 200 is implemented in a DNN architecture, the neural network 200 may include a greater number of layers that may process valid information, and may thus process more complex data sets than a neural network having a single layer. Although the neural network 200 is illustrated in FIG. 2 as including four layers, the neural network 200 may include fewer or more layers or channels. That is, the neural network 200 may include layers of various structures different from one illustrated in FIG. 2.

Each of the layers included in the neural network 200 may include a plurality of channels, where each of the channels may include or represent a plurality of artificial nodes known as neurons, processing elements (PEs), units, and the like, configured to process data of the corresponding channel. While the nodes may be referred to as "artificial nodes" or "neurons," such reference is not intended to impart any relatedness with respect to how the neural network architecture computationally maps or thereby intuitively recognizes information and how a human's neurons operate. I.e., the terms "artificial nodes" or "neurons" are merely terms of art referring to the hardware implemented nodes of a neural network. As, as illustrated in FIG. 2, Layer 1 may include two channels (or nodes) and each of Layer 2 and Layer 3 may include three channels, but examples may not be limited thereto. For example, each of the layers included in the neural network 200 may include various numbers of channels (or nodes).

The channels included in each of the layers of the neural network 200 may be connected to one another to process data. For example, one channel may perform an operation by receiving data from other channels and output a result of the operation to other channels.

An output value of a channel may be referred to as an activation, or a value which results from such a predetermined activation function of the corresponding channel. An input and an output of each of the channels may be referred to as an input activation and an output activation, respectively. An activation may be a parameter corresponding to an output of one channel and, at the same time, an input of channels included in a subsequent layer, due to corresponding connection(s) with the next layer. Each of the channels may determine its activation based on activations and weights received from channels included in a previous layer. A weight may be a parameter used to calculate an output activation in each channel and a value allocated to a connection between channels. For example, an output from a previous layer's channel may be provided to as an input to a channel of a next or subsequent layer through a weighted connection between the previous layer's channel and the channel of the next layer, with the weight of the weighted connection being variously adjusted during the training of the neural network until the neural network is trained for a desired objective. There may be additional connections to the channel of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

Accordingly, each of the channels, or representative nodes of such a channel, may receive an input (e.g., through, or by further considering, such weighted connections), and process the input by a computational unit or a PE that outputs an output activation. An input and an output of each of the channels may be mapped. The computational unit may be configured to perform the activation function for a node. As a non-limiting example, when a denotes an activation function, $W_{jk}^i$ denotes a weight from a kth channel included in an i-1th layer to a jth channel included in an ith layer, $b_j^i$ denotes a bias of the jth channel included in the ith layer, and $a_j^i$ denotes an activation of the jth channel in the ith layer, $a_j^i$ may be calculated as expressed by Equation 1, for example.

$$a_j^i = \sigma \left( \sum_k \left( w_{jk}^i \times a_k^{i-1} \right) + b_j^i \right) \qquad \text{Equation 1}$$

As illustrated in FIG. 2, an activation of a first channel (CH1) of Layer 2 may be represented as $a_1^2$, and $a_1^2$ may have a value of $a_1^2 = \sigma(w_{1,1}^2 \times a_1^1 + w_{1,2}^2 \times a_2^1 + b_1^2)$ based on Equation 1. However, Equation 1 is provided merely as an example to describe an activation, a weight, and a bias used to process data in the neural network 200, and thus examples may not be limited thereto. The activation may be a value obtained by calculating a weighted sum of activations received from a previous layer using the activation function a such as a sigmoid function or a rectified linear unit (ReLU) function.

Figure 3:
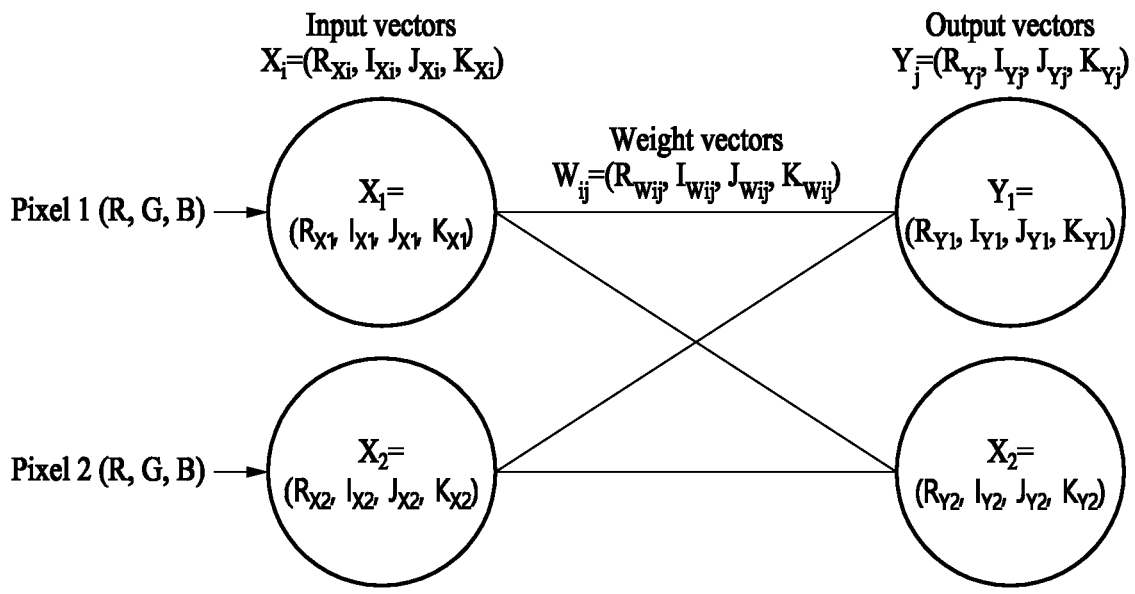
FIG. 3 illustrates an example of an operation performed in a quaternion vector neural network.

FIG. 3 illustrates an example of an operation performed in a quaternion vector neural network.

Referring to FIG. 3, a quaternion neural network (QNN) is illustrated. Input vectors may be four-dimensional (4D) vectors, and each input vector $X_i$ may include a real number element $R_{xi}$ and imaginary number elements $I_{xi}$, $J_{xi}$, and $K_{xi}$, in which i denotes a natural number. Output vectors may be 4D vectors, and each output vector $Y_j$ may include a real number element Ry and imaginary number elements $I_{yj}$, $J_{yj}$, and $K_{yj}$, in which j denotes a natural number. Weight vectors may be 4D vectors, and each weight vector $W_{ij}$ may represent a connection weight between an ith input node and a jth output node and include a real element number $R_{Wij}$ and imaginary number elements $I_{Wij}$, $J_{Wij}$, and $K_{Wij}$.

A quaternion may be a 4D vector represented by one real number element and three imaginary number elements i, j, and k. The three imaginary number elements i, j, and k may be orthogonal to one another. Thus, multiplication and addition between quaternions ($Q_1 = a_1 + b_1 i + c_1 j + d_1$ k and $Q_2 = a_2 + b_2 i + c_2 j + d_2$ k) may be performed as follows.

$Q_1 + Q_2 = (a_1 + a_2) + (b_1 + b_2)i + (c_1 + c_2)j + (d_1 + d_2)k$ $Q_1 \times Q_2 = (a_1 \times a_2 - b_1 \times b_2 - c_1 \times c_2 - d_1 \times d_2) + (a_1 \times b_2 + b_1 \times a_2 + c_1 \times d_2 - d_1 \times c_2)i + (a_1 \times c_2 - b_1 \times d_2 + c_1 \times a_2 + d_1 \times b_2)j + (a_1 \times d_2 + b_1 \times c_2 - c_1 \times b_2 + d_1 \times a_2)k$ A quaternion-based MAC operation may be performed based on multiplication and addition among a quaternion input ($P_l^q = a^p{}_l i + b^p{}_l i + c^p{}_{lm} j + d^p{}_l k$) a quaternion weight ($W_{lm}^q = a^w{}_{lm} + b^w{}_{lm} i + c^w{}_{lm} j + d^w{}_{lm} k$), and a quaternion weight conjugate ($W_{lm}^q{}^* = a^w{}_{lm} - b^w{}_{lm} i - c^w{}_{lm} j - d^w{}_{lm} k$), which may be expressed by Equation 2 below, for example.

$$S_m^q = \sum_{l=1}^{L} \frac{W_{lm}^q \times p_l^q \times W_{lm}^q}{W_{lm}^q \times W_{lm}^q} \qquad \text{Equation 2}$$

$$= \sum_{l=1}^{L} \frac{\begin{array}{l}(a_{lm}^w + b_{lm}^w i + c_{lm}^w j + d_{lm}^w k) \times \\ (a_l^p + b_l^p i + c_l^p j + d_l^p k) \times \\ (a_{lm}^w - b_{lm}^w i - c_{lm}^w j - d_{lm}^w k)\end{array}}{\begin{array}{l}(a_{lm}^w + b_{lm}^w i + c_{lm}^w j + d_{lm}^w k) \times \\ (a_{lm}^w - b_{lm}^w i - c_{lm}^w j - d_{lm}^w k)\end{array}}$$

For example, in spatial recognition, three-dimensional (3D) spatial coordinate data of x, y, and z for position and movement changes of a target object may be handled. To input N sets of 3D spatial coordinate data, a real valued neural network (RVNN) that performs training and inference based on a real number MAC operation may separate x, y, and z values of each set of data, and transmit the values to a total of 3N input nodes. When training and inference are performed in the RVNN with a correlation between the x, y, and z values in each set of 3D spatial coordinate data disappearing, performance may decrease, or a significantly large model size, a great computation amount, and great power consumption may be needed to reconstruct the correlation between the x, y, and z values in the RVNN and improve training performance.

In contrast, in a case of the QNN of one or more embodiments, each input node may receive and output a quaternion value, and thus the QNN may represent the x, y, and z values of the 3D spatial coordinate data as three imaginary number elements i, j, k of a quaternion, and perform training and inference while maintaining the correlation between the x, y, and z values. The QNN may perform a neural operation based on a rotation operation between a quaternion input vector and a quaternion weight vector. Since training and inference are performed with the correlation between x, y, and z values of the 3D spatial coordinate data being maintained, the QNN of one or more embodiments may have a higher training and inference performance than the RVNN.

In image recognition, red (R), green (G), and blue (B) values of each pixel may be represented by three imaginary number elements i, j, and k of a quaternion such that training and inference are performed while a correlation between the RGB values (which represents detailed color information of each pixel) is being maintained. Thus, the QNN of one or more embodiments may have a higher training and inference performance than the RVNN. A real number element included in a quaternion vector may be 0, and a real number element of a quaternion output vector that is output by a neural operation between the quaternion input vector and the quaternion weight vector may be 0.

Various signals, for example, 3D spatial coordinate data and pixel value, that exist in the natural world may be mostly defined as multidimensional vectors, and thus a multidimensional vector MAC operation-based neural network (e.g., a complex-valued neural network (CVNN) and a QNN) may have a higher training and inference performance.

FIGS. 4 through 7 illustrate examples of performing quantization on a quaternion vector.

As described above, a QNN of one or more embodiments may have a higher training and inference performance than a RVNN. To efficiently drive a quaternion-based neural network model in various devices including, for example, a smartphone, a parameter of an 8-bit, 4-bit, or lower bit format may be used instead of a parameter of a FP32 format.

An example of a conversion characteristic between a quaternion vector and a Euler angle will be described hereinafter with reference to FIG. 4.

A quaternion vector $Q$ ($=q_1+q_2i+q_3j+q_4 k$) may represent a rotation characteristic in 3D spatial coordinates, which may be expressed based on a Euler angle by Equation 3 below, for example.

$$q_1=\cos(\theta/2)$$

$$q_2=\sin(\theta/2)\cdot\cos(\text{\euro}_x/2)$$

$$q_3=\sin(\theta/2)\cdot\cos(\text{\euro}_y/2)$$

$$q_4=\sin(\theta/2)\cdot\cos(\text{\euro}_z/2) \qquad \text{Equation 3}$$

Figure 4:
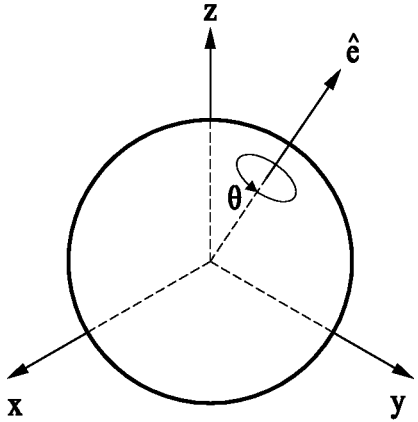
FIGS. 4 through 7 illustrate examples of performing quantization on a quaternion vector.

In Equation 3, $\text{\euro}_x$ denotes an angle at which a rotation axis a illustrated in FIG. 4 is inclined with respect to an x-axis, $\text{\euro}_y$ denotes an angle at which the rotation axis a is inclined with respect to a y-axis, and $\text{\euro}_z$ denotes an angle at which the rotation axis a is inclined with respect to a z-axis. $\theta$ denotes an angle at which a reference sphere illustrated in FIG. 4 rotates on the rotation axis ê. That is, the quaternion vector $Q$ may represent a rotation by $\theta$ based on the rotation axis inclined by $\text{\euro}_x$, $\text{\euro}_y$, and $\text{\euro}_z$ with respect to the x, y, and z axes, respectively.

A quaternion vector neural network may use a pure quaternion vector having a real number element of 0 as an input vector, a weight vector, and an output vector. Thus, each imaginary number element of the quaternion vector $Q$ may correspond to each Euler angle parameter one-to-one, as expressed by Equation 4 below, for example.

$$q_1=\cos(\pi/2)=0$$

$$q_2=\sin(\pi/2)\cdot\cos(\text{\euro}_x/2)=\cos(\text{\euro}_x/2)$$

$$q_3=\sin(\pi/2)\cdot\cos(\text{\euro}_y/2)=\cos(\text{\euro}_y/2)$$

$$q_4=\sin(\pi/2)\cdot\cos(\text{\euro}_z/2)=\cos(\text{\euro}_z/2) \qquad \text{Equation 4}$$

An imaginary number element $q_2$ may correspond to a Euler angle $\text{\euro}_x$, an imaginary number element $q_3$ may correspond to a Euler angle $\text{\euro}_y$, and an imaginary number element $q_4$ may correspond to a Euler angle $\text{\euro}_z$.

Thus, even by operating a neural network in 3D spatial coordinates that are intended to be represented by a quaternion vector $Q$ based on a rotation characteristic, power consumption used for an operation itself may be small in compared to total power consumption.

Figure 5:
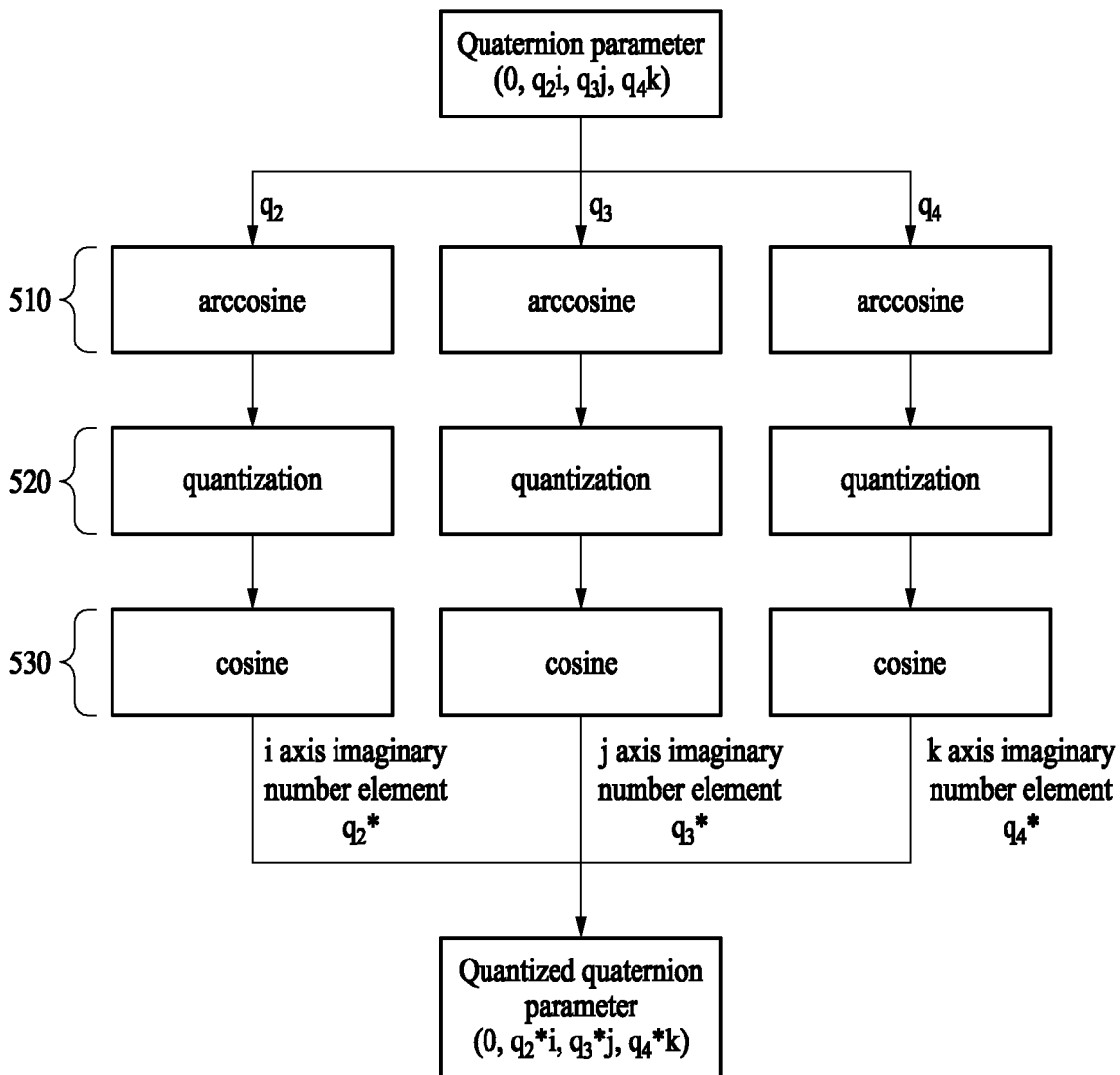

A method of performing quantization on a neural network will be described hereinafter with reference to FIG. 5.

As described above, a quaternion vector neural network may use a pure quaternion vector having a real number element of 0, and quantization may be performed on a quaternion parameter vector $Q$ ($=q_2i+q_3j+q_4 k$).

The quantization that converts a quaternion parameter vector into a low-bit number may be performed based on a characteristic of conversion between a quaternion vector and a Euler angle. A simplest method used to convert a real number parameter into a low-bit number (e.g., N-bit) may be calculating minimum and maximum values of the parameter, dividing a minimum and maximum value range into $2^N$ sections at equal intervals, and obtaining a median value of each section through conversion. A method used for a quaternion parameter may be calculating minimum and maximum values of each of imaginary number element values i, j, and k, dividing a minimum and maximum value range by $2^N$ sections at equal intervals, and obtaining a median value of each section through conversion. However, when information to be represented by an actual quaternion vector is rotation information of 3D spatial coordinates of x, y, and z axes, it may be more desirable to perform the quantization as follows.

In operation 510, a neural network quantization apparatus may convert, into a Euler angle, each of imaginary number element values $q_2$, $q_3$, and $q_4$ of i, j, and k axes of a quaternion parameter vector, as expressed by Equation 5 below, for example. A characteristic of conversion between a quaternion vector and the Euler angle, which is derived from Equation 4, may be used.

$$\text{\euro}_x/2=\arccos(q_2)$$

$$\text{\euro}_y/2=\arccos(q_3)$$

$$\text{\euro}_z/2=\arccos(q_4) \qquad \text{Equation 5}$$

In operation 520, the neural network quantization apparatus may perform quantization on Euler angles obtained by the converting. The quantized Euler angles may be expressed by Equation 6 below, for example.

$$\text{\euro}_x^*/2=\text{Quantization}(\text{\euro}_x/2)$$

$$\text{\euro}_y^*/2=\text{Quantization}(\text{\euro}_y/2)$$

$$\text{\euro}_z^*/2=\text{Quantization}(\text{\euro}_z/2) \qquad \text{Equation 6}$$

Figure 6:
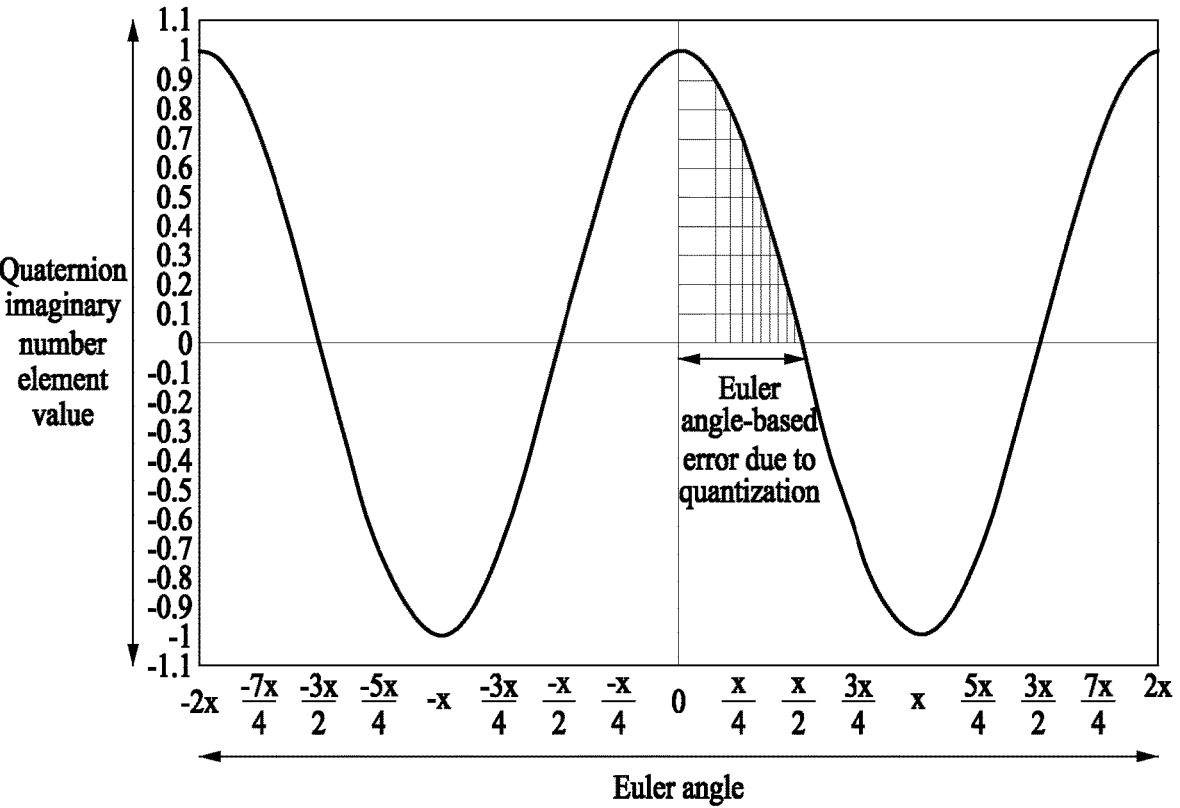

Referring to FIG. 6, a typical neural network quantization apparatus may directly quantize each imaginary number element value of a quaternion at equal intervals without conversion into a Euler angle. When the typical neural network quantization apparatus divides a range of imaginary number element values of the quaternion at equal intervals and performs the quantization, an error variance of Euler angles may be great, and thus a loss of a rotation characteristic may be great due to the quantization.

Figure 7:
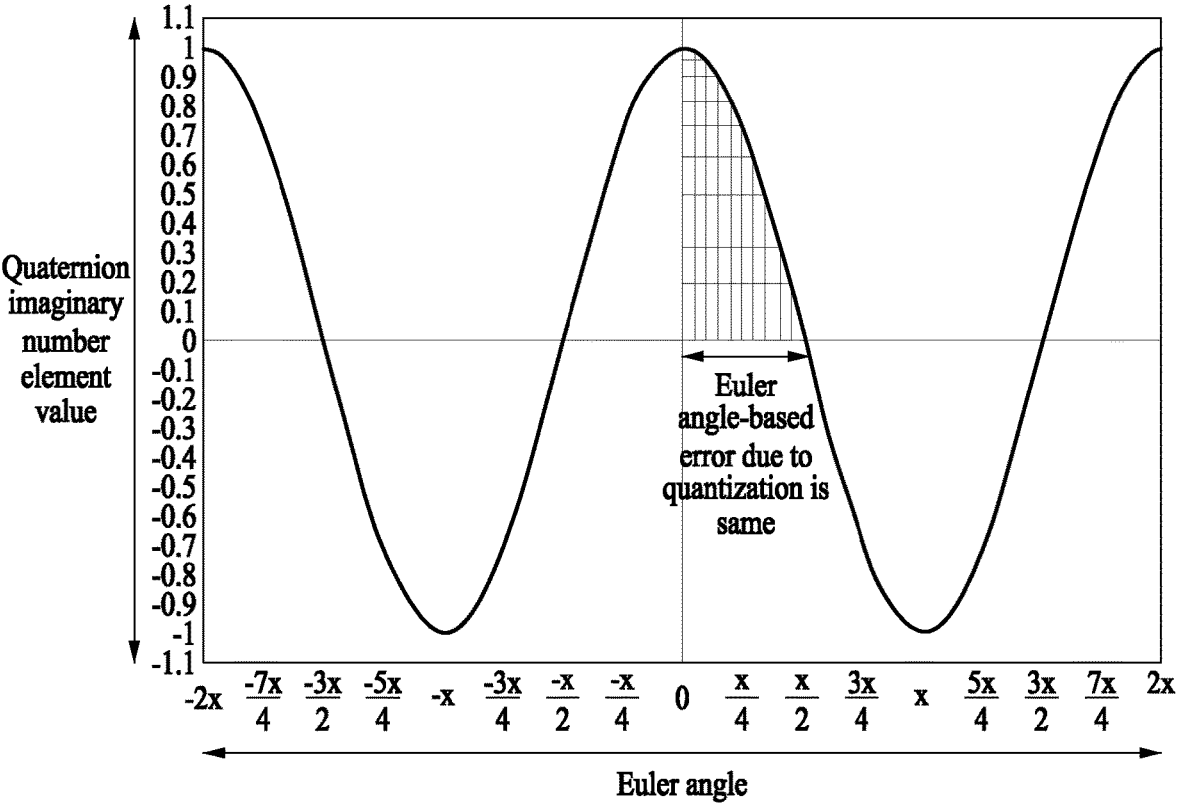

In contrast, referring to FIG. 7, the neural network quantization apparatus of one or more embodiments may divide a range of Euler angles at equal intervals after conversion into the Euler angles, and may then perform quantization. When the neural network quantization apparatus of one or more embodiments divides the range of the Euler angles at equal intervals and performs the quantization, Euler angle information intended to be originally represented may be quantized at the same or similar level in all sections, and thus a rotation characteristic may be advantageously maintained through the quantization.

Referring back to FIG. 5, in operation 520, the neural network quantization apparatus may divide such a Euler angle range at equal intervals at a $2^N$ level and determine a median value of each section to obtain median values $\epsilon_x^*$, $\epsilon_y^*$, and $\epsilon_z^*$. An algorithm to be applied to quantization may include, for example, a linear quantization and a nonlinear quantization.

In operation 530, the neural network quantization apparatus may determine each of quantized parameter elements $q_2^*$, $q_3^*$, and $q_4^*$ based on the quantized Euler angles. The quantized parameter elements $q_2^*$, $q_3^*$, and $q_4^*$ may be expressed by Equation 7 below, for example.

$$q_2^*=\cos(\epsilon_x^*/2)$$

$$q_3=\cos(\epsilon_y^*/2)$$

$$q_4^*=\cos(\epsilon_z/2) \qquad \text{Equation 7}$$

As described above, the neural network quantization apparatus of one or more embodiments may represent, as a low-bit number, each imaginary number element value of a quaternion parameter vector while minimizing a quantization error associated with an original rotation characteristic.

Figure 8:
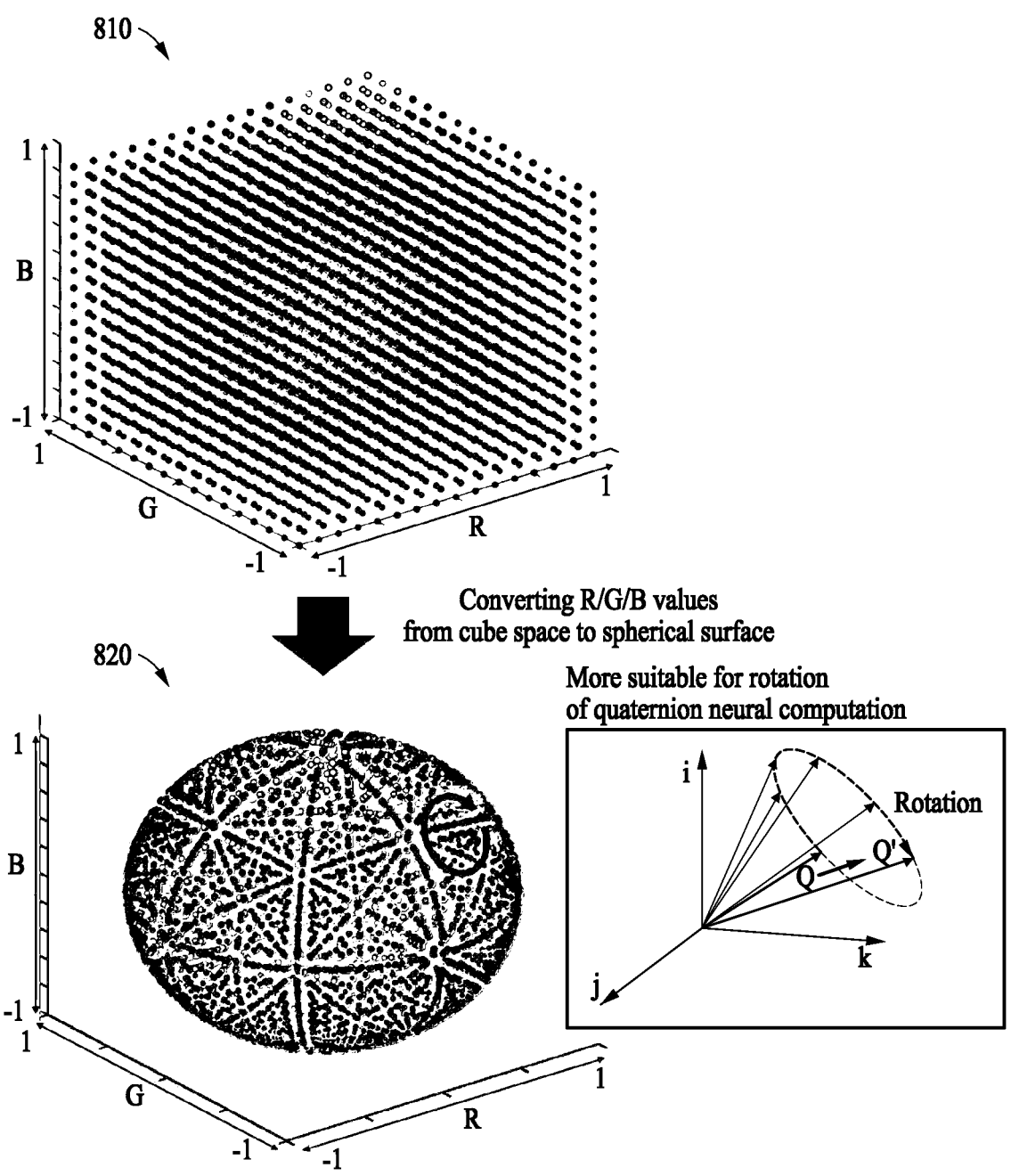
FIG. 8 illustrates an example of converting red (R), green (G), and blue (B) values of each pixel included in an image into a quaternion vector.

FIG. 8 illustrates an example of converting RGB values of each pixel included in an image into a quaternion vector.

In the example of FIG. 8, illustrated are a case 810 in which RGB values of each pixel included in an image are represented by a characteristic of distribution in a cube space and a case 820 in which the RGB values are represented by a characteristic of distribution on a spherical surface.

In the case 810 in which RGB values of each pixel included in an image are represented by a characteristic of distribution in a cube space, a quaternion vector of each pixel may be represented as $P=0+R\cdot i+G\cdot j+B\cdot k$. The RGB values may be represented as coordinate values respectively corresponding to x, y, and z values of 3D space coordinates.

Three imaginary number elements of a quaternion vector may be used to represent rotation information of 3D orthogonal coordinates, rather than position information of the 3D orthogonal coordinates. Based on this, in a method of determining an imaginary number element value of a quaternion vector by RGB values of each pixel, a similarity (or a difference) in color information between pixels may be represented as a Euclidean distance in the 3D orthogonal coordinates. That is, a form of a quaternion may only be taken, and a rotation characteristic in the 3D orthogonal coordinates that is intended to be represented by the quaternion may not be sufficiently represented. This may adversely affect a training and inference performance of a QNN. In addition, a color change in such a form may be represented by a linear movement, and thus this may not be suitable for a rotation operation of the QNN.

In the case 820 in which RGB values of each pixel included in an image are represented by a characteristic of distribution on a spherical surface, a conversion may be performed such that RGB values of each pixel in an input image are distributed on a surface of a sphere having a radius of 1, which may be expressed by Equation 8 below, for example.

$$R^*=R/\sqrt{R^2+G^2+B^2}$$

$$G^*=G/\sqrt{R^2+G^2+B^2}$$

$$B^*=B/\sqrt{R^2+G^2+B^2} \qquad \text{Equation 8}$$

Since all colors may be represented by a rotation on the surface of the sphere having the radius of 1, the RGB values of each pixel may be represented in a form suitable for a rotation operation of the QNN. A quaternion vector may be represented as $P=0+R^*i+G^*j+B^*k$ based on pixel values obtained through the conversion.

Figure 9:
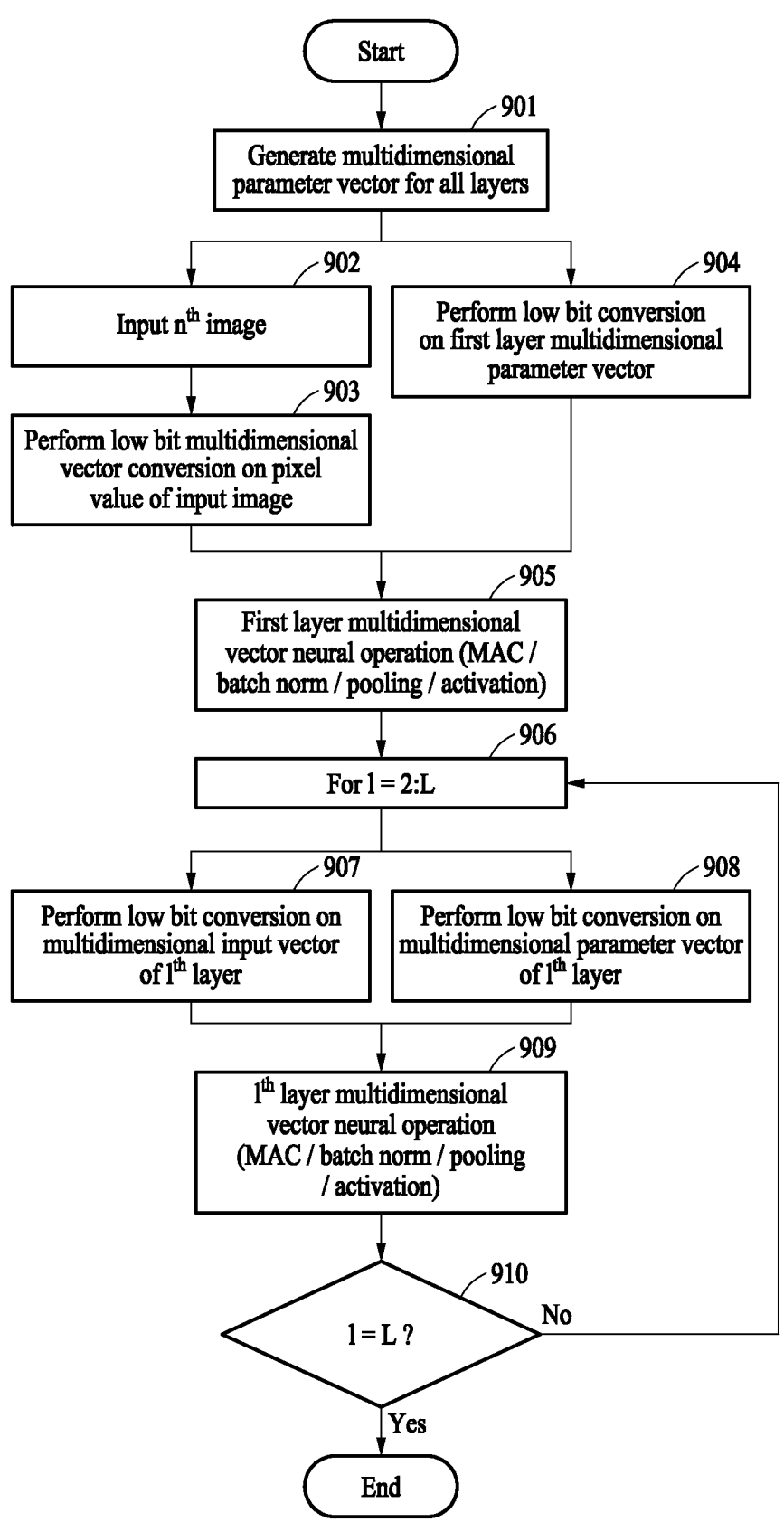
FIG. 9 illustrates an example of a method of operating a neural network based on multidimensional quantization.

FIG. 9 illustrates an example of a method of operating a neural network based on multidimensional quantization.

An inference operation of a quantization-based multidimensional vector neural network may be performed as described hereinafter with reference to FIG. 9. The inference operation may be performed by an electronic apparatus (e.g., where the electronic apparatus is, or includes, the neural network quantization apparatus).

In operation 901, the electronic apparatus may generate a multidimensional parameter vector of a plurality of layers included in a neural network. For example, the electronic apparatus may determine a multidimensional parameter vector based on a parameter that is learned in advance and stored in a memory. The multidimensional parameter vector may include a weight vector to be applied to a multidimensional vector neural network. The multidimensional parameter vector may be a quaternion vector including a plurality of imaginary number elements.

In operation 902, the electronic apparatus may input an nth image to the neural network. The nth image may be an image that is a target of inference.

In operation 903, the electronic apparatus may perform a low-bit multidimensional vector conversion on a pixel value of an input image. For example, the electronic apparatus may convert RGB values of each pixel included in the input image into coordinates on a surface of a sphere, determine a multidimensional input vector including the converted values of each pixel as imaginary number elements, and perform quantization on the multidimensional input vector based on a Euler angle.

In operation 904, the electronic apparatus may perform a low-bit conversion on a multidimensional parameter vector of a first layer. For example, the electronic apparatus may perform quantization on a weight vector associated with the first layer based on the Euler angle (e.g., the quantization as described above with reference to FIG. 5).

In operation 905, the electronic apparatus may perform a multidimensional vector neural operation of the first layer. For example, the electronic apparatus may perform the neural operation based on a quantized multidimensional input vector and a quantized weight vector. The neural operation may include any one of MAC, batch normalization (batch norm), pooling, and activation, but examples may not be limited thereto.

In operation 906, the electronic apparatus may perform the quantized neural operation on remaining layers included in the neural network, and perform the following operations for a lth layer.

In operation 907, the electronic apparatus may perform a low-bit conversion on a multidimensional input vector that is output from a l-1th layer and is then input to the lth layer. For example, the electronic apparatus may perform quantization on the multidimensional input vector of the lth layer based on the Euler angle.

In operation 908, the electronic apparatus may perform a low-bit conversion on a multidimensional parameter vector of the lth layer. For example, the electronic apparatus may perform quantization on a weight vector associated with the lth layer based on the Euler angle.

In operation 909, the electronic apparatus may perform a multidimensional vector neural operation of the lth layer. The electronic apparatus may perform the neural operation based on the quantized multidimensional input vector and the quantized weight vector of the lth layer.

In operation 910, the electronic apparatus may determine whether the lth layer is a last layer included in the neural network, that is, a Lth layer. When the lth layer is not the Lth layer, operation 906 may be performed subsequently. When the lth layer is the Lth layer, the inference operation may be terminated. When the lth layer is the Lth layer, a result of multidimensional vector neural operation may correspond to an inference result of the inference operation, and/or the electronic apparatus may perform an inference based on the result.

Figure 10:
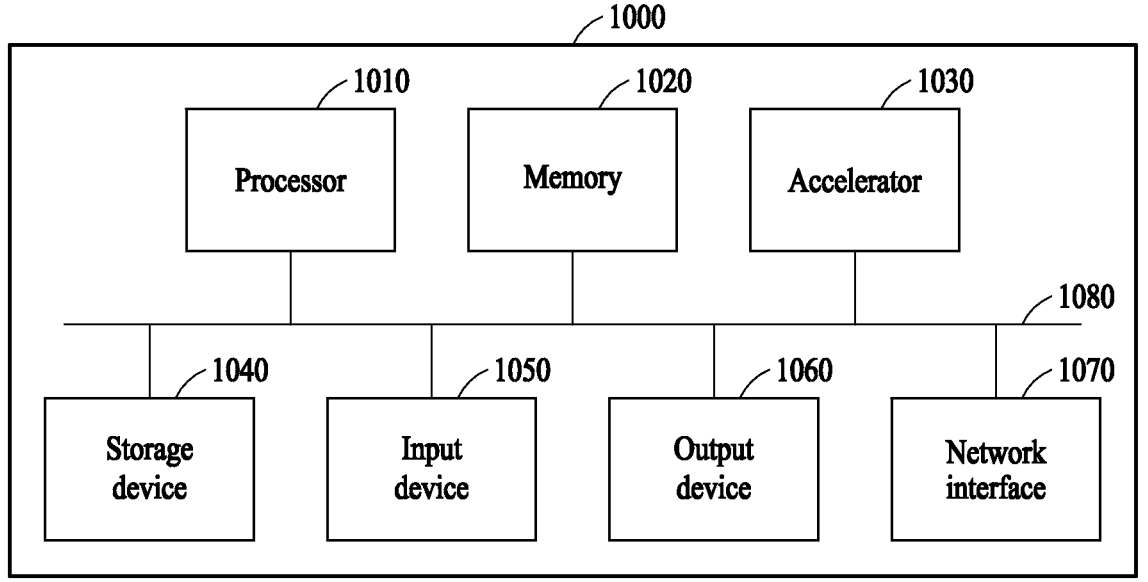
FIG. 10 illustrates an example of an electronic apparatus.

FIG. 10 illustrates an example of an electronic apparatus.

Referring to FIG. 10, an electronic apparatus 1000 may include a processor 1010 (e.g., one or more processors), a memory 1020 (e.g., one or more memories), an accelerator 1030, a storage device 1040, an input device 1050, an output device 1060, and a network interface 1070. The processor 1010, the memory 1020, the accelerator 1030, the storage device 1040, the input device 1050, the output device 1060, and the network interface 1070 may communicate with one another through a bus 1080. For example, the electronic apparatus 1000 may be implemented as a part of a mobile device including, for example, a mobile phone, a smartphone, a personal digital assistant (PDA), a netbook, a tablet personal computer (PC), a laptop computer, and the like, a wearable device including, for example, a smartwatch, a smart band, smart glasses, and the like, a computing device including, for example, a desktop, a server, and the like, a home appliance including, for example, a television (TV), a smart TV, a refrigerator, and the like, a security device including, for example, a door lock and the like, and a vehicle including, for example, an autonomous vehicle, a smart vehicle, and the like.

The processor 1010 may perform functions and commands to be performed in the electronic device 1000. For example, the processor 1010 may process commands stored in the memory 1020 or the storage device 1040. The memory 1020 may include a computer-readable storage medium or a computer-readable storage device. The memory 1020 may store commands to be executed by the processor 1010, and store related information while software and/or applications are executed by the electronic device 1000.

The accelerator 1030 may be an artificial intelligence (AI) accelerator configured to execute a neural network to infer input data, and be a separate processor distinguished from the processor 1010. For example, the accelerator 1030 may be a neural processing unit (NPU), a graphics processing unit (GPU), a tensor processing unit (TPU), a digital signal processor (DSP), and the like. The accelerator 1030 may process tasks that may be more efficiently processed by a separate dedicated processor (e.g., the accelerator 1030) than by the processor 1010 used for general purposes based on characteristics of operations of the neural network. The processor 1010 and/or the accelerator 1030 may perform one or more of the methods and operations described above with reference to FIGS. 1 through 9.

The storage device 1040 may store more information than the memory 1020 and store the information for a long period of time. The storage device 1040 may include, for example, a magnetic hard disk, an optical disc, a flash memory, a floppy disk, and other types of nonvolatile memory device well known in the related technical fields.

The input device 1050 may receive an input from a user by a traditional input method through a keyboard and a mouse, or by a new input method through a touch input, a voice input, and an image input. The input device 1050 may include, for example, a keyboard, a mouse, a touchscreen, a microphone, and any other device that detects an input from a user and transmits the detected input to the electronic device 1000. The output device 1060 may provide an output of the electronic apparatus 1000 to a user through a visual, auditory, or tactile channel. The output device 1060 may include, for example, a display, a touchscreen, a speaker, a vibration generation device, and any other device that provides an output to a user. The network interface 1070 may communicate with an external device through a wired or wireless network.

The neural network quantization apparatuses, the electronic apparatuses, neural network training apparatuses, neural network inference apparatuses, processors, memories, accelerators, storage devices, input devices, output devices, network interfaces, buses, neural network training apparatus 100, neural network inference apparatus 150, electronic apparatus 1000, processor 1010, memory 1020, accelerator 1030, storage device 1040, input device 1050, output device 1060, network interface 1070, bus 1080, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with neural network quantization, the method comprising:
   generating a quantized neural network by:
      converting, by applying a same angle function to each of parameter elements comprised in a multidimensional parameter vector of a multidimensional vector neural network, each of the parameter elements into a Euler angle;
      performing quantization on the Euler angles; and
      determining each of quantized parameter elements of the quantized neural network based on the quantized Euler angles,
   wherein the performing of the quantization comprises, for each of the Euler angles, performing quantization on the Euler angle by dividing a Euler angle range at equal intervals.

2. The method of claim 1, wherein the converting comprises:
   converting each of the parameter elements into the Euler angle based on a conversion characteristic between a multidimensional vector and the Euler angle.

3. The method of claim 1, wherein the determining of each of the quantized parameter elements comprises:
   determining each of the quantized parameter elements from the quantized Euler angles, based on a conversion characteristic between a multidimensional vector and the Euler angles.

4. The method of claim 1, wherein the multidimensional parameter vector is a quaternion vector comprising a plurality of imaginary number elements.

5. The method of claim 1, wherein the multidimensional parameter vector comprises a weight vector applied to the multidimensional vector neural network.

6. The method of claim 1, further comprising:

converting values of each pixel comprised in an image to be input to the multidimensional vector neural network into coordinates on a spherical surface; and determining a multidimensional input vector comprising the converted values of each pixel as elements.

7. The method of claim 6, wherein the values of each pixel comprised in the image are converted into the coordinates on the spherical surface by dividing the values of each pixel by a square root of the values of each pixel.

8. The method of claim 6, further comprising:

converting each of input elements comprised in the multidimensional input vector into a second Euler angle;

performing second quantization on the second Euler angle; and determining each of quantized input elements based on a second quantized Euler angle obtained through the second quantization.

9. The method of claim 1, further comprising:

performing quantization on each of input elements comprised in a multidimensional input vector that is input to a layer of the neural network corresponding to the quantized parameter elements based on the Euler angle.

10. A non-transitory computer-readable storage medium storing instructions that, when executed by a processor, configure the processor to perform the method of claim 1.

11. An apparatus with neural network quantization, the apparatus comprising:

one or more processors configured to generate a quantized neural network by:

converting, by applying a same angle function to each of parameter elements comprised in a multidimensional parameter vector of a multidimensional vector neural network, each of the parameter elements into a Euler angle;

performing quantization on the Euler angles; and determining each of quantized parameter elements of the quantized neural network based on the quantized Euler angles, wherein, for the performing of the quantization, the one or more processors are configured to, for each of the Euler angles, perform quantization on the Euler angle by dividing a Euler angle range at equal intervals.

12. The apparatus of claim 11, wherein, for the converting, the one or more processors are configured to:

convert each of the parameter elements into the Euler angle based on a conversion characteristic between a multidimensional vector and the Euler angle.

13. The apparatus of claim 11, wherein, for the determining of each of the quantized parameter elements, the one or more processors are configured to:

determine each of the quantized parameter elements from the quantized Euler angle, based on a conversion characteristic between a multidimensional vector and the Euler angle.

14. A processor-implemented method with neural network quantization, the method comprising:

generating a quantized low-precision neural network in a low-precision format by:

converting multidimensional parameters comprised in a multidimensional parameter vector of a high-precision neural network in a high-precision format by applying a same angle function to each of the parameters;

performing quantization on the converted parameters; and generating the quantized low-precision neural network by applying another angle function to the quantized parameters, wherein a number of bits of the high-precision format is greater than a number of bits of the low-precision format.

15. The method of claim 14, wherein the same angle function is an inverse of the other angle function.

16. The method of claim 14, further comprising performing a multidimensional vector neural operation on an input vector using the generated low-precision neural network.

17. The method of claim 16, wherein the operation comprises any one of a multiplication and accumulation (MAC), batch normalization, pooling, and activation operation.

18. The method of claim 17, further comprising performing an inference operation based on a result of the operation.

* * * * *